United States Patent [19]

Giles

[11] 4,326,373

[45] Apr. 27, 1982

[54] INTEGRATED GAS TURBINE POWER GENERATION SYSTEM AND PROCESS

[75] Inventor: Walter B. Giles, Scotia, N.Y.

[73] Assignee: General Electric Company, Schenectady, N.Y.

[21] Appl. No.: 154,233

[22] Filed: May 29, 1980

[51] Int. Cl.³ .............................................. F02C 3/26
[52] U.S. Cl. .............................. 60/39.02; 60/39.46 S; 60/39.51 R; 60/682
[58] Field of Search ......... 60/39.02, 39.46 S, 39.46 P, 60/650, 682, 39.51 R; 417/150; 122/4 D

[56] References Cited

U.S. PATENT DOCUMENTS

| | | | |
|---|---|---|---|
| 2,471,755 | 5/1949 | Karrer | 60/655 |
| 2,861,737 | 11/1958 | Bowen | 417/150 |
| 4,116,005 | 9/1978 | Willyoung | 60/655 |
| 4,150,547 | 9/1977 | Hobson | 60/682 |
| 4,150,953 | 3/1979 | Woodmansee | 48/71 |

OTHER PUBLICATIONS

Moskowitz et al., "Pressurized Fluidized Bed Pilot Electric Plant-A Technological Status", ASME Paper Presented Mar., 1979.
Friedlander, "Exploiting Our 'Dam' Potential!", in Electrical World, pp. 72-73, May, 1978.
Schultz, "Hydraulic Air Compressors", Bureau of Mines Information Circular 7683, May, 1954.

Primary Examiner—Louis J. Casaregola
Attorney, Agent, or Firm—Charles E. Bruzga; James C. Davis, Jr.; Marvin Snyder

[57] ABSTRACT

Heat generated in an atmospheric coal combustion process is recovered by air compressed in a hydraulic compressor and passed through air heaters in an associated coal combustor and through a heat exchanger means in thermal contact with the exhaust flow of a gas turbine to thereby provide a heated compressed motive fluid for the production of useful work in the turbine.

9 Claims, 2 Drawing Figures

INTEGRATED GAS TURBINE POWER GENERATION SYSTEM AND PROCESS

BACKGROUND OF THE INVENTION

This invention relates to an integrated coal-fired gas turbine power plant, and more particularly, to an integrated power plant and process employing a hydraulic compressor-gas turbine combined cycle.

Integrated coal-fired gas turbine power plants are well known. A typical integrated plant arrangement includes a pressurized coal combustion system wherein a gaseous effluent is produced and is employed to drive an associated expansion turbine. A mechanical compressor provides pressurized air to the coal combustion system. Such plants also typically include a secondary cycle wherein waste heat contained in the exhaust of the expansion turbine is utilized in a heat recovery steam generator to produce steam for driving a cooperating steam turbine electrical generator assembly. A plant of the foregoing type is described by Woodman-see in U.S. Pat. No. 4,150,953 assigned to the assignee hereof.

An improved plant of this type is disclosed by Applicant in copending patent application Ser. No. 069,775, filed Aug. 27, 1979 and assigned to the assignee hereof. The improved power plant described therein includes a hydraulic compressor which enables improvements in performance as well as the beneficial elimination of secondary steam cycles and of the mechanical compressor typical of conventional integrated plants. However, all integrated power plants incorporating pressurized coal combustion systems require a complicated pressurized coal feeding system. Additionally, since the gaseous effluent produced in such a plant contains contaminants detrimental to the operation of an associated gas turbine, these plants require extensive relatively high temperature gaseous effluent cleanup systems which increase both capital and power production costs.

Integrated plants which employ substantially atmospheric coal combustion systems are also known, such as that described by Willyoung in U.S. Pat. No. 116,005 which is assigned to the assignee hereof. In such a plant air is compressed by a mechanical compressor and is passed through an air heater positioned within an associated coal combustion system. In this manner, the compressed air is heated and is then passed to an expansion turbine in which it is expanded to produce useful work. The resultant expanded air is then passed to an inlet of the combustion system and is utilized therein in a coal combustion process.

Since clean heated air is expanded in an associated gas turbine rather than a gaseous effluent, an extensive gaseous effluent cleanup system is not required. Instead, a conventional relatively low temperature particulate removal system is often sufficient to clean a system exhaust, provided the exhaust has been sufficiently cooled. Similarly, no pressurized coal feeding apparatus is required. However, integrated plants of this type require bottoming cycles to efficiently utilize the heat generated in a combustion process.

More specifically, gaseous effluent is typically exhausted from an atmospheric coal combustion process at a temperature of approximately 700° F. Since air exhausted from a conventional mechanical compressor is typically of a temperature of approximately 650° F., there is insufficient temperature differential to allow efficient utilization this otherwise wasted heat without the employment of a bottoming cycle. However, the use of such bottoming cycles results in a significant capital cost expenditure and further complicates the operation of an integrated power plant. Moreover, these bottoming cycles typically exhibit a significant thermal lag which renders an associated integrated plant undesirable for service in quick-response applications such as in an electrical peaking power unit. Since electricity generated in such peaking plants is generally substantially more costly than that generated by base loaded plants, an integrated coal-fired gas turbine plant which would be useful in a peaking application would be highly advantageous.

In addition to the foregoing, it is also advantageous to minimize the size of a combustor in an integrated power generation system to reduce both capital costs and thermal losses. Accordingly, it is an object of the present invention to provide a new and improved integrated gas turbine power generation system and process which utilizes substantially all of the available heat energy generated therein while minimizing the size of an associated combustor.

Another object of the present invention is to provide an integrated coal-fired gas turbine power generation system which may be employed in peaking applications.

Another object of the present invention is to provide a new integrated coal-fired power generation system with improved cycle efficiency.

Still another object of the present invention is to reduce the cost and complexity of conventional integrated coal-fired gas turbine power generation systems.

SUMMARY OF THE INVENTION

The above and other objects and advantages of the present invention are achieved in an integrated coal-fired gas turbine power generation system including an atmospheric fluidized bed combustor; first and second interconnected air heaters disposed in the combustor in and above the fluidized bed, respectively; a gas expansion turbine adapted to receive heated compressed gas from the first air heater and to discharge expanded gas to both the combustor and to a heat exchanger means; a hydraulic compressor disposed to discharge substantially isothermally compressed gas to the inlet of the second air heater and to an inlet of the heat exchanger means, and with the heat exchanger means adapted to transfer heat from the influent expanded gas to the compressed gas and to discharge the thusly pre-heated compressed gas to an inlet of the first air heater. In a preferred embodiment gas compressed in the hydraulic compressor is stored during periods of low power demand for subsequent use in the generation of power to meet peak system load demands. In another embodiment a means is provided for increasing the temperature of the compressed gas supplied to the gas turbine to increase system output and efficiency. A process for producing useful work in such an integrated power generation system is also disclosed.

BRIEF DESCRIPTION OF THE DRAWING

For better understanding of the invention, reference may be had to the accompanying drawing wherein.

DESCRIPTION OF THE INVENTION

Figure 1:
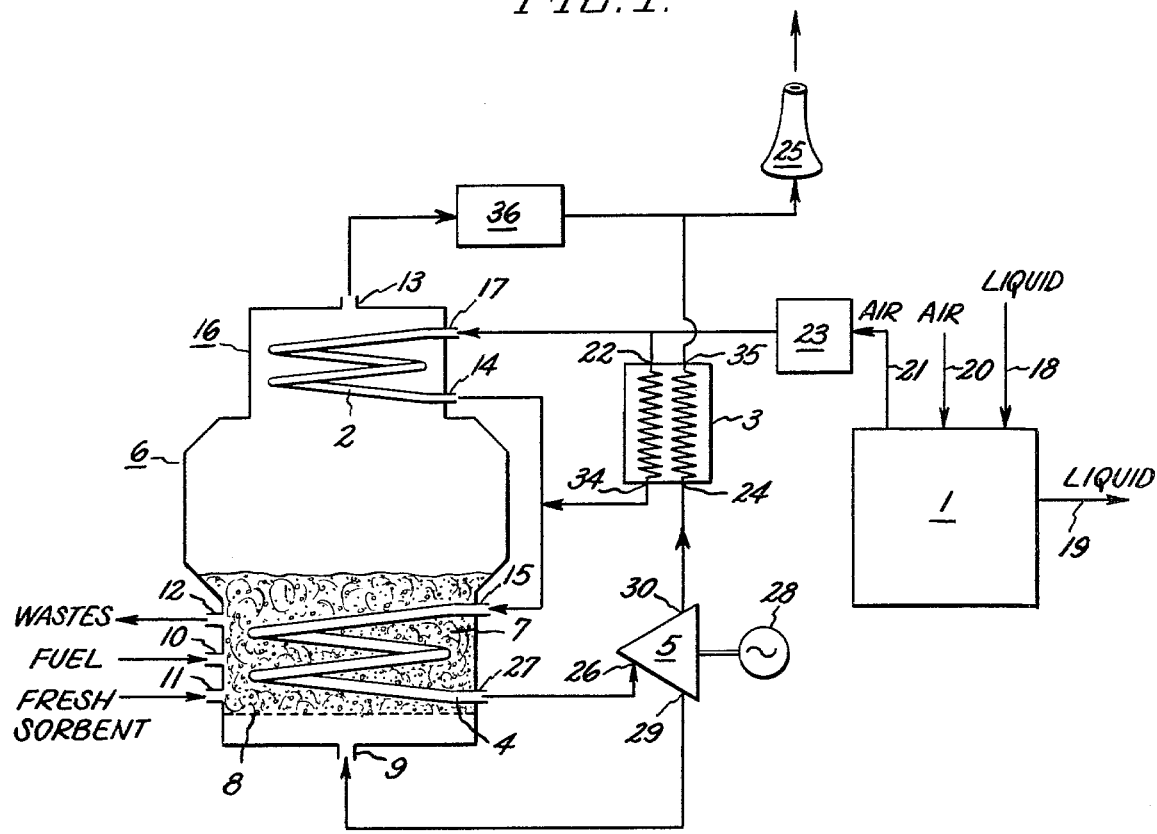
FIG. 1 is a simplified schematic view illustrating an embodiment of the present invention.

As depicted in FIG. 1, an integrated coal-fired gas turbine power plant includes a hydraulic compressor 1 from which quantities of compressed air are directed through a second air heater 2 and through a heat exchanger means 3 for pre-heating. The preheated compressed air is further heated during its passage through a first air heater 4, from which it is discharged to an expansion turbine 5 wherein it is expanded to provide useful work. Quantities of the resulting expanded air are passed through the heat exchanger means 3 and into a conventional atmospheric fluidized bed combustor 6 as detailed hereinbelow.

The combustor 6 is of conventional design and is adapted for the combustion of carbonaceous fuel at nearly atmospheric pressures. In order to minimize sulfur emissions from the system the combustor 6 preferably includes a fluidizable bed 7 comprising a plurality of sulfur-sorbing particles to capture detrimental sulfur oxides formed in a combustion process. The particles are operatively suspended above a grate 8 by a stream of gas flowing therethrough. The sulfur-sorbing particles may advantageously include limestone (calcium carbonate) or dolomite (calcium magnesium carbonate) crushed to a maximum dimension of ⅛ to ¼ inch.

The combustor 7 depicted in FIG. 1 includes a first inlet 9 for receiving a stream of expanded gas exhausted from the turbine 4 which fluidizes the bed 7 and supports combustion. The combustor also includes a second inlet 10 for receiving a carbonaceous fuel such as coal which is to be fed into the bed 7, and a third inlet 11 for receiving fresh sulfur-sorbing particles. An outlet 12 is provided for the discharge of wastes such as spent sorbent particles and ash solids. Additionally, a second outlet 13 is provided for the discharge of effluent gases from the combustor 6.

The first air heater 4 is substantially immersed in the fluidizable bed 7 to effectively enable the extraction of heat therefrom during a combustion process. The second air heater 2 is connected at its outlet 14 to the inlet 15 of the first air heater and is positioned in a freeboard region 16 of the combustor above the bed 7 to enable the extraction of available heat from hot effluent gases flowing from a combustion process in the bed 7. Both air heaters may advantageously be formed from high temperature alloys such as Inconel 601, Hasteloy X or Haynes Alloy 188. Additionally, both air heaters are indirect systems so that materials contacting the external heat exchange surfaces thereof do not mix with compressed gas flowing therethrough.

Since environmental constraints will normally necessitate the removal of particulate matter from the gaseous effluent from the combustor 6 prior to its discharge into the atmosphere, a particulate removal means 36 may be beneficially connected in the effluent flow path after the combustor outlet 13. Since the present invention extracts sufficient heat from the gaseous effluent, relatively low temperature conventional particulate separation devices such as electrostatic precipitators, bag house filters or other devices may be employed to remove particulates from the gaseous effluent. Thus, significant advantage is achieved over certain integrated power generation systems as described hereinabove.

Compressed gas such as air is provided to the second air heater inlet 17 by a conventional hydraulic compressor means 1. As more fully described for several typical hydraulic compressor systems in the Bureau of Mines Informational Circular 7683, entitled "Hydraulic Air Compressors", (May, 1954), air or an alternative gas to be compressed is absorbed into a downflowing column of a liquid such as water and is compressed thereby. The liquid may be supplied to a point of sufficient height in an associated hydraulic compressor system as by the impoundment of a flowing stream, or through a pump-back process in a dedicated pool arrangement, which arrangement also reduces siting constraints on the present system.

The supplied liquid enters the compressor means 1 through an inlet 18 and is discharged through an outlet 19. A gas enters the compressor means through an inlet 20, and is exhausted from the compressor means as a compressed gas through an outlet 21 connected in flow communication with both the air heater inlet 17 and an inlet 22 of the heat exchanger means 3. In a preferred embodiment of the present invention, a means 23 is provided for the storage of compressed air during periods of low power demand to enable utilization of the present invention in a peaking mode of operation as described hereinbelow.

The heat exchanger means 3 may be a conventional regenerative heat exchanger in which heat from turbine exhaust entering through an inlet 24 is transferred to the compressed gas entering through the inlet 22. A suitable conventional means such as tube bundles immersed in a fluid is provided within the heat exchanger 3 to enable this heat transfer to be effected indirectly without intermixing of the two fluids. The resultant heated compressed gas is discharged to the first air heater inlet 15, while the resultant cooled turbine exhaust is directed to a stack 25 for discharge into the atmosphere.

In order to obtain useful work from the heated compressed gas discharged from the first air heater 4, a conventional gas expansion turbine 5 is connected at its inlet 26 to the air heater outlet 27. As depicted in FIG. 1, an electrical generator 28 is coupled with the rotor of the turbine to enable the production of electrical power in a conventional manner. Gas expanded during the power production process is discharged through two outlets 29 and 30 and is directed to the combustor inlet 9 and the heat exchanger means inlet 24, respectively.

Figure 2:
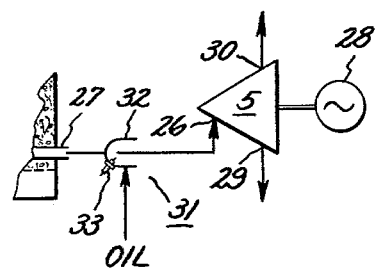
FIG. 2 is a simplified partial schematic view illustrating a means for increasing the temperature of compressed gas supplied to a gas turbine according to another embodiment of the present invention.

In an alternative embodiment of the present invention a means 31 is provided for increasing the temperature of the hot compressed gas supplied to the gas turbine inlet 26. As depicted in FIG. 2, the means 31 includes a conventional gas turbine combustor 32 selectively supplied with fuel such as oil or a similar ignitable fluid and connected in flow communication with a supply of heated compressed gas from the first air heater outlet 27. A suitable igniter means such as a spark plug 33 is also included to ignite a mixture of fuel and compressed gas in the combustor 32.

In operation in an application requiring a substantially continuous supply of power, a flow of a liquid such as water enters the hydraulic compressor means 1 through the inlet 18 and flows down a vertical fall tube therein. As the liquid flows down this tube is entrains a gas such as air entering the hydraulic compressor through the inlet 20. The fall tube typically terminates in a separation chamber in which the entrained gas is separated from the liquid by buoyancy forces. The liquid rises through a riser to an exit level where it is discharged through the outlet 19. In this manner, the gas is substantially isothermally compressed to a suitable pressure.

A first quantity of isothermally compressed gas is supplied to the second air heater 2 through the inlet 17. The gas is therein conducted through the combustor freeboard region 16 where the gas extracts available heat from hot effluent gases by indirect thermal contact. The heated compressed air is then discharged from the second air heater through the outlet 14 and is directed into the first air heater 4.

A second quantity of compressed gas is supplied from the hydraulic compressor outlet 21 to the heat exchanger means 3 through the inlet 22. This second quantity of compressed gas is heated by utilizing a conventional means in the heat exchanger 3 to effect the indirect transfer of heat from expanded gas exhausted from the turbine 5. Thusly heated, the compressed gas is discharged from a heat exchanger means 3 through an outlet 34 and is directed into the first air heater 4.

The recombined quantities of compressed gas preheated in the second air heater 2 and the heat exchanger means 3 are then further heated in the first air heater 4. More specifically, the preheated compressed gas is passed through the first air heater 4 to extract heat from the combustor fluidized bed 7. This heat is extracted by indirect heat transfer which is enhanced by the fluidized action of the particles in the bed 7.

The heated compressed gas is then discharged from the first air heater outlet 27 to the expansion turbine inlet 26. The gas is expanded in the turbine 5 to provide useful work by driving the turbine and an associated load such as the electrical generator 25.

After expansion in the turbine 4, the resultant gas is at nearly atmospheric pressure (but sufficiently higher to overcome pressure losses associated with flow through the combustor means 3 and the remainder of the system). A first quantity of the expanded gas is then directed into the fluidized bed combustor 6 where is fluidizes the bed 7, causing its materials to circulate and behave essentially as a fluid. Within the bed 7, carbonaceous fuel is received through the inlet 10 and is burned. The resultant hot combustion gases are scavenged of sulfur oxides by the sulfur-sorbing particles in the bed 10, with spent sorbent particles and ash solids being discharged through the outlet 12. Of course, a portion of the heat generated during the combustion process is extracted from the bed to heat the gas passing through the first air heater 4 as described above. The resultant de-sulfured combustion gases together with expanded gas supplied through the inlet 9 in excess of that required to sustain combustion form a hot gaseous effluent from the fluidized bed 7.

The hot gaseous effluent from the fluidized bed is passed through the freeboard region 16 and is cooled therein by means of heat transfer with the gas passing through the second air heater 2 as described above. Thus cooled, the effluent gases are exhausted from the fluidized bed combustor 6 through the outlet 13 and are passed through the particulate removal means 36 where solid particulates are removed. Thus cooled and cleaned, the effluent gases are exhausted to the atmosphere through the stack 25.

Simultaneously, a second quantity of expanded gas is exhausted from the turbine through the outlet 30 and enters the heat exchanger means 3. Within the means 3 heat available from the expanded gas is indirectly transferred to the compressed gas flowing through the means 3 from inlet 22 to outlet 34 as described above. Thus cooled, the expanded gas is then directed through a heat exchanger means outlet 35 to the stack 25 through which it is exhausted to the atmosphere.

Thus, the present invention is an integrated power generation system which efficiently provides useful power through the efficient extraction of available heat generated in a carbonaceous fuel combustion process. This power is provided without resort to any secondary power cycles and enables the employment of a relatively small atmospheric combustor.

By way of example, an exemplary system designed to produce approximately 7.2 MWe and employing a gas turbine requiring an air mass flow rate of 40 lb./sec. would require a cooperating atmospheric fluidized bed having a relatively small flow area of only approximately 70 square feet. A suitably sized hydraulic compressor operating with a typical efficiency of 0.82 would provide flows of ambient air (approximately 70° F.) at rates of 10 lb./sec. and 30 lb./sec. to the second air heater inlet 17 and to the heat exchanger means inlet 22, respectively. The air passed through the second air heater would be heated to approximately 1166° F., while the resulting effluent gases exhausted through the outlet 13 would be cooled to approximately 180° F. Of course, if insufficient sulfur capture is effected in the fluidized bed 7, the effluent gas exhaust temperature will be limited to more than 300° F. to avoid $SO_3$ condensation and a resulting sulfuric acid attack on associated equipment.

The compressed air passing through the heat exchanger means 3 is heated to approximately 612° F. while the expanded gas exhausted from the turbine outlet 30 is cooled from approximately 658° F. to about 150° F. Thusly preheated, the two air flows are combined to enter the first air heater inlet 15 at 40 lb./sec. and about 750° F. Sufficient heat is extracted from the bed 7 to heat the compressed air in the heater 4 to a temperature of about 1350° F.

The turbine 5 operating at a typical efficiency of 0.89 would expand the air and cool it to approximately 658° F., at which temperature flows of the air are directed at rates of 8 lb./sec. and of 32 lb/sec. into the combustor inlet 9 and the heat exchanger means inlet 24, respectively. By means of the combustion process in the fluidized bed 7, the air entering through the inlet 9 forms a gaseous effluent heated to a temperature of approximately 1550° F. This hot gaseous effluent is cooled to a temperature of about 180° F. in the freeboard region 16 through heat exchange with the air passing through the second air heater 2 as noted above. As also noted above, the 32 lb./sec. airflow is cooled to approximately 150° F. in the heat exchanger means 3. This exemplary system as described would achieve an efficiency of approximately 0.61, and would do so without the use of any bottoming cycles.

In a preferred embodiment, the present invention may be employed to provide peaking power. In this embodiment, compressed air is stored in the means 23 during periods of low demand. Simultaneously, the fluidized bed 7 would be allowed to slump, but would retain sufficient heat for quick startups and to avoid thermal shock to the system. During periods of increased demand, stored compressed air is withdrawn from the storage means 23 and is provided to the air heater 2 and heat exchanger means 3, with the remainder of the process operating as described hereinabove.

In yet another embodiment, the heated compressed air directed to the turbine inlet 26 is heated as by oil or gas firing in the combustor 32 to further increase cycle efficiency. This embodiment also has the advantage of increasing power density, and thus reducing capital costs. Moreover, this embodiment is beneficial in peaking situations where the output of a typically base loaded plant can be promptly increased to meet a higher demand.

It is noted that the present invention allows fuel to be supplied to a combustion process with an atmospheric feed system, and omits the turbine and cleanup system corrosion, fouling or erosion problems associated with a pressurized combustion system. Similarly, temperature losses associated with cleanup system equipment required to meet turbine constraints are avoided. Additionally, neither equipment associated with a steam bottoming cycle nor a physically large fluidized bed combustor is required to enable the recovery of available heat, thereby minimizing both capital and maintenance costs. Moreover, the present invention provides a coal-fired gas turbine power generation system suitable for providing relatively inexpensive peaking power.

The above-described embodiments of this invention are intended to be exemplitive only and not limiting and it will be appreciated from the foregoing by those skilled in the art that many substitutions, alterations and changes may be made to the disclosed system and process without departing from the spirit and scope of the invention.

What is claimed is:

1. An integrated gas turbine power generation system comprising:
   (a) a fluidized bed combustor adapted for the combustion of carbonaceous fuel at nearly atmospheric pressure, said combustor including a bed of fluidizable particles, a freeboard region disposed to conduct effluent gases from said fluidizable bed out of said combustor, means for admitting said particles and carbonaceous fuel to said fluidizable bed, and an inlet for receiving a fluidizing and combustion gas at nearly atmospheric pressure;
   (b) a gas expansion turbine having an inlet for receiving heated compressed gas, a first outlet in flow communication with said combustor inlet for discharging thereto a first quantity of expanded gas, and a second outlet for discharging a second quantity of expanded gas;
   (c) a first air heater disposed within said combustor in contact with the particles in said fluidizable bed and having an outlet for discharging heated compressed gas in flow communication with said turbine inlet, and an inlet for receiving preheated compressed gas;
   (d) a second air heater disposed within said combustor freeboard region and having an outlet for discharging preheated compressed gas in flow communication with said first air heater inlet, and an inlet for receiving compressed gas;
   (e) a hydraulic compressor means for substantially isothermally compressing a flow of gas, said compressor means having a first outlet for discharging compressed gas in flow communication with said second air heater inlet, a second outlet for discharging liquid, a first inlet for a flow of gas to be compressed, and a second inlet for said liquid; and
   (f) a heat exchanger means having a first inlet in flow communications with said second turbine outlet for receiving said second quantity of expanded gas, a second inlet in flow communication with said compressor means first outlet for receiving compressed gas, a first outlet for discharging said second quantity of expanded gas, a second outlet for discharging preheated compressed gas in flow communication with said first air heater inlet, and means within said heat exchanger means to enable the indirect transfer of heat from said second quantity of expanded gas to said compressed gas.

2. A power generation system as in claim 1 wherein the particles in said fluidizable bed are sulfur-sorbing particles selected from the group consisting of dolomite and limestone and said combustor includes an outlet for discharging spent sulfur-sorbing particles.

3. A power generation system as in claim 1 wherein the carbonaceous fuel utilized in said combustor is coal in particulate form and said combustor includes an outlet for discharging ash solids.

4. A power generation system as in claim 1 further comprising a means for storing compressed gas disposed in flow communication with said hydraulic compressor first outlet for receiving compressed gas therefrom and with said second air heater inlet and said heat exchanger means second inlet for discharging said received compressed gas thereto.

5. A power generation system as in claim 1 further comprising a combustion chamber disposed in flow communication intermediate said first air heater outlet and said turbine inlet, a means for selectively supplying an ignitable fuel to said chamber, a means in said chamber for intermixing heated compressed gas directed from said first air heater outlet with said ignitable fuel, and a means for igniting said intermixed gas and fuel in said chamber.

6. In an integrated gas turbine power generation system having an atmospheric combustor with a fluidizable bed and a freeboard region, a first air heater immersed in said fluidizable bed, a second air heater disposed in said freeboard region, a gas expansion turbine, a heat exchanger means, and a hydraulic compressor means, a process for producing useful work by directing heated compressed gas to an inlet of said turbine, expanding the gas in said turbine to provide useful work, and discharging the expanded gas from said turbine, in which process said heated compressed gas directed to said gas turbine inlet is provided by:
   (a) substantially isothermally compressing gas in said hydraulic compressor means and passing first and second quantities of said compressed gas through said second air heater and said heat exchanger means, respectively;
   (b) combining said first and second quantities of compressed gas and passing the combined quantity of compressed gas through said first air heater to said turbine inlet;
   (c) heating said combined quantity of compressed gas by providing carbonaceous fuel to the fluidizable bed of said combustor, directing a first quantity of said expanded gas discharged from said turbine through said bed to effect the fluidization thereof, effecting the combustion of said fuel with said expanded gas whereby said bed is heated and a hot gaseous effluent is generated, and effecting an indirect transfer of heat from said bed to said combined quantity of compressed gas passing through said first air heater;

(d) preheating said first quantity of compressed gas by exhausting said hot gaseous effluent through said combustor freeboard region in thermal contact with said second air heater to effect the transfer of heat from said hot gaseous effluent to said first quantity of compressed gas passing through said second air heater; and (e) preheating said second quantity of compressed gas by directing a second quantity of expanded gas discharged from said turbine through said heat exchanger means in indirect thermal contact with said second quantity of compressed gas to effect a transfer of heat therein from said expanded gas to said compressed gas.

7. A process as in claim 6 in which useful work is produced periodically to correspond with varying demand therefor in which process gas compressed in said hydraulic compressor means is directed to a storage means for storage therein during periods of relatively low work demand, and is withdrawn from said storage means to provide said first and second quantities of compressed gas during periods of relatively high work demand.

8. A process as in claim 6 or in claim 7 in which the temperature of the heated compressed gas supplied to the inlet of the gas turbine is increased by selectively supplying an ignitable fuel to said heated compressed gas during the passage of said heated compressed gas from said first air heater outlet to said turbine inlet, mixing said fuel and said heated compressed gas, igniting said mixture to initiate a combustion process in which heat is added to said heated compressed gas, and passing the resultant heated compressed gas to said turbine inlet.

9. A process as in claim 6 in which sulfur compounds are generated in the combustion of said carbonaceous fuel, are entrained in said hot gaseous effluent, and are removed from said hot gaseous effluent in said combustor fluidizable bed by providing sulfur-sorbing particles in said bed, fluidizing said bed during the combustion of said carbonaceous fuel therein by passing said first quantity of expanded gas therethrough to effect an intimate mixing of said sulfur-sorbing particles with said hot gaseous effluent whereby said sulfur compounds are absorbed by said particles, and discharging spent sulfur-sorbing particles from said combustor.

* * * * *